No. 636,051. Patented Oct. 31, 1899.
G. B. MARX.
HAND CART.
(Application filed June 23, 1899.)
(No Model.) 2 Sheets—Sheet 1.

Attest:
A. N. Jesbera.
John M. Scoble.

Inventor:
George B. Marx
by Redding, Kiddle & Greeley
Attys.

No. 636,051. Patented Oct. 31, 1899.
G. B. MARX.
HAND CART.
(Application filed June 23, 1899.)

(No Model.) 2 Sheets—Sheet 2.

Attest:
A. N. Jesbera
John M. Scoble

Inventor:
George B. Marx.
by Redding, Kiddle & Greeley
Attys.

UNITED STATES PATENT OFFICE.

GEORGE B. MARX, OF NEW YORK, N. Y.

HAND-CART.

SPECIFICATION forming part of Letters Patent No. 636,051, dated October 31, 1899.

Application filed June 23, 1899. Serial No. 721,520. (No model.)

*To all whom it may concern:*

Be it known that I, GEORGE B. MARX, a citizen of the United States, residing in the borough of Manhattan, city of New York, State of New York, have invented certain new and useful Improvements in Hand-Carts for Street-Sweepers, &c., of which the following is a specification, reference being had to the accompanying drawings, forming a part hereof.

This invention has for its object to produce an improved hand-cart for street-sweepers' use which shall be capable of carrying both a can and a bag in readiness to receive sweepings, while permitting the easy removal of both or either, and shall be light in weight, strong in construction, and inexpensive to manufacture.

The improved hand-cart will be more fully described hereinafter with reference to the accompanying drawings, wherein it is illustrated in a desirable form, and in which—

Figure 1:
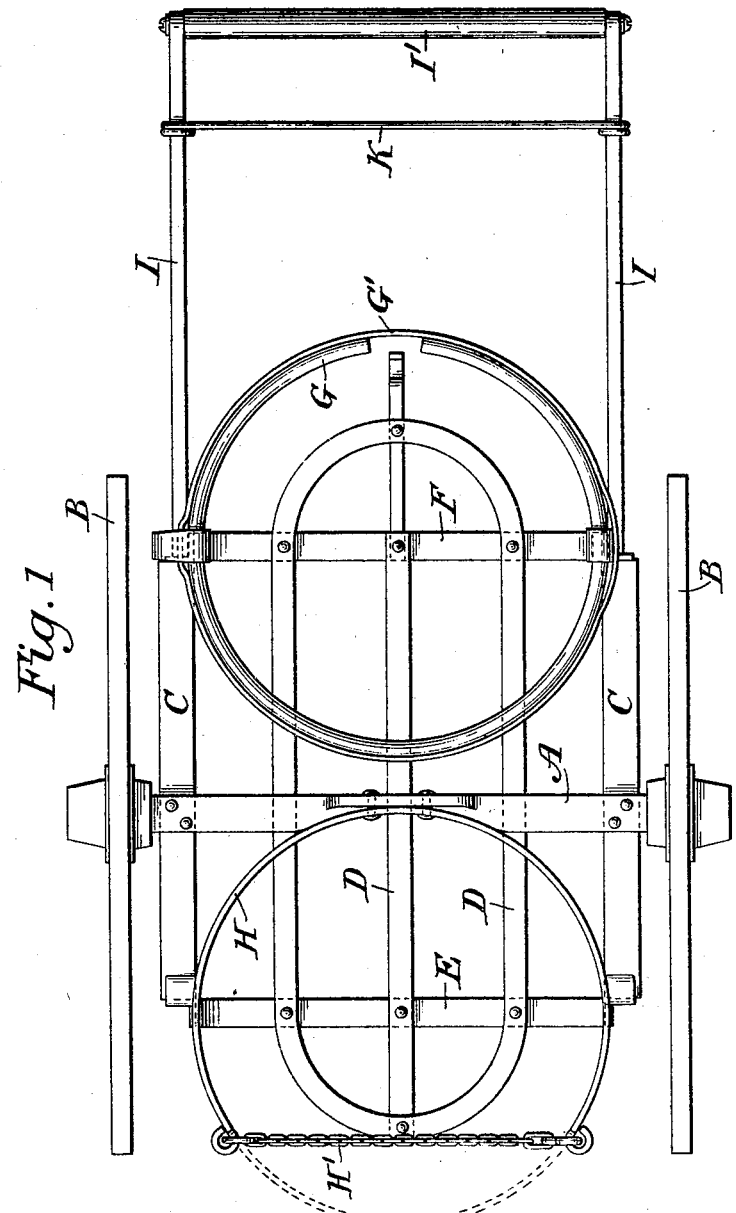
Figure 2:
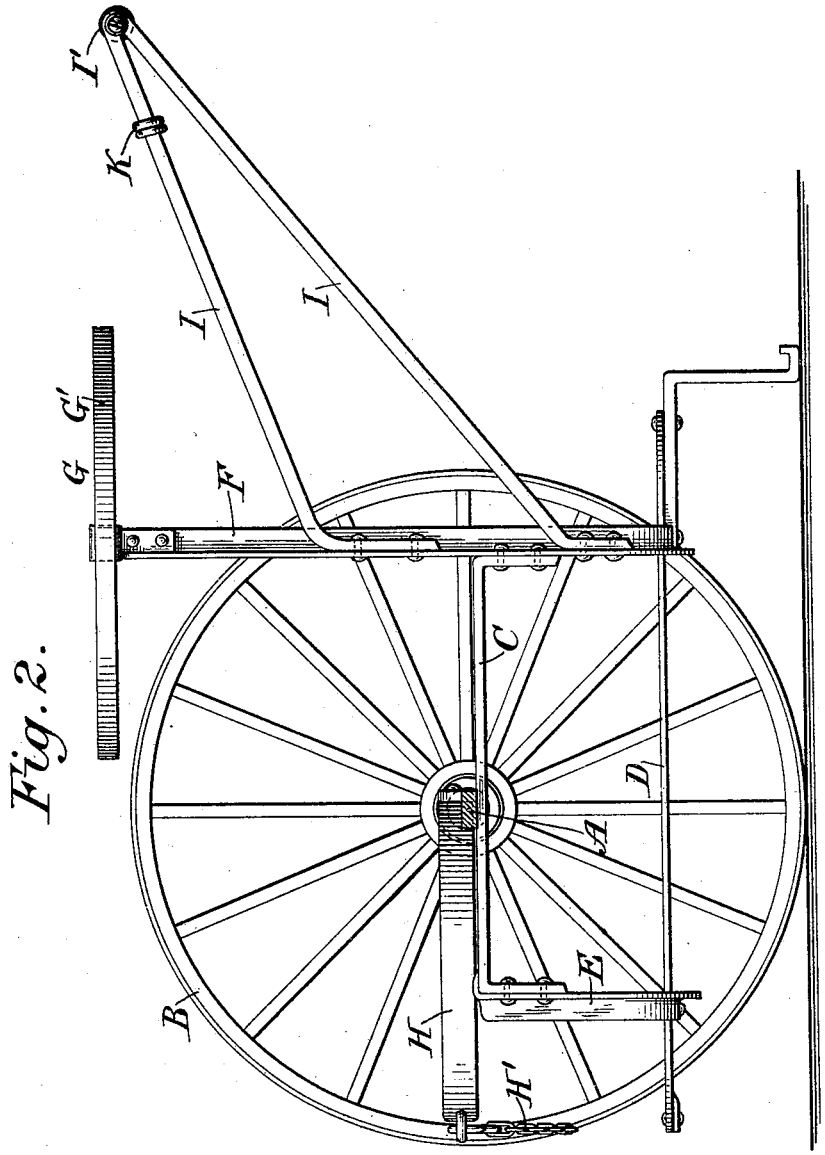

Figure 1 is a plan view of the improved hand-cart, and Fig. 2 is a side view thereof with the near wheel removed and the axle in section.

As represented in the drawings, the axle A, which supports or receives the wheels B, is extended through from side to side, thereby at once securing a stiffer structure than if the wheels were mounted on stub-axles secured to the sides of a supporting-frame. Longitudinal bars C are secured to the axle and extend forward and aft of the same to support below them and below the axle a common floor-frame, which also extends both forward and aft of the axle. At one end of the longitudinal bars, with one of the vertical members secured to each bar, is a U-shaped frame E, the horizontal member of which sustains or forms a part of the common floor-frame D. A similar U-shaped frame F is secured to the other ends of the longitudinal bars, its horizontal member also sustaining or forming a part of the common floor-frame, while its vertical members are extended above said longitudinal bars to support a bag-sustaining ring G, on which the bag is held with its mouth open by a clamping-ring G'. A can-clamp H is secured to the axle A on the side opposite the frame F, and the can, when placed therein and resting on the floor-frame D, is held in position by said clamp, the ends of which may be connected by a chain H'. The ends of the clamp H being widely separated, the can is easily removed and replaced by unhooking the chain. The bottom of the bag, when in position on the cart with its top held by the ring G, rests upon the floor-frame.

Handle-frames I are secured to the vertical members of the bag-frame F and support in convenient position the transverse handle-bar I'. A bar K is applied to the handle-frames I to slide thereon parallel with the handle-bar I' and is designed to support the empty bags. The bags are held from accidental dislodgment by pressing the bar K toward the handle-bar I' to clamp the bags between the two bars.

I claim as my invention—

1. In a vehicle of the character described, the combination of an axle and wheels, a floor-frame supported from said axle, a can-clamp carried by the axle on one side of the same, a bag-clamp carried by the axle on the other side, and a handle, substantially as shown and described.

2. In a vehicle of the character described, the combination of an axle and wheels, longitudinal bars secured to said axle, a floor-frame suspended from said bars, a can-clamp carried by said axle, uprights secured to said floor-frame and bars, and a bag-clamp carried by said uprights, substantially as shown and described.

3. In a vehicle of the character described, the combination of an axle and wheels, a floor-frame supported from said axle, uprights secured to said floor-frame, a bag-clamp carried by said uprights, handle-frames secured to said uprights, a handle-bar secured to said handle-frames, and a transverse bar sliding on said handle-frames parallel with the handle-bar, substantially as shown and described.

4. In a vehicle of the character described, the combination of a through axle and wheels, a common floor-frame extended forward and aft of the axle, a can-clamp and a bag-clamp carried by said axle and floor-frame forward and aft of the axle, and a handle, substantially as shown and described.

This specification signed and witnessed this 19th day of June, A. D. 1899.

GEORGE B. MARX.

In presence of—
L. R. MOORE,
ANTHONY N. JESBERA.